United States Patent
Herring

(10) Patent No.: US 6,565,300 B2
(45) Date of Patent: May 20, 2003

(54) TIE DOWN ASSEMBLY ATTACHMENT METHOD FOR STRAIGHTENING AND REINFORCING PICKUP TRUCK BED WALLS

(76) Inventor: Mitchell D. Herring, 624 E. Harry, Wichita, KS (US) 67211

( * ) Notice: Subject to any disclaimer, the term of this patent is extended or adjusted under 35 U.S.C. 154(b) by 69 days.

(21) Appl. No.: 09/915,632

(22) Filed: Jul. 26, 2001

(65) Prior Publication Data

US 2003/0021648 A1 Jan. 30, 2003

(51) Int. Cl.[7] .................................................. B60P 7/08
(52) U.S. Cl. ...................... 410/102; 410/106; 410/108; 410/110; 410/115; 29/270
(58) Field of Search ........................... 410/96, 97, 102, 410/106, 108, 110, 115, 116; 296/183, 36, 41, 32; 248/499; 29/290, 283.5, 700

(56) References Cited

U.S. PATENT DOCUMENTS

| | | | | |
|---|---|---|---|---|
| 4,253,785 A | * | 3/1981 | Bronstein | 410/110 |
| 4,604,013 A | * | 8/1986 | Elwell et al. | 410/106 |
| 4,650,382 A | * | 3/1987 | Johnson | 410/110 |
| 4,818,006 A | * | 4/1989 | Arndt | |
| 4,936,724 A | * | 6/1990 | Dutton | 410/110 |
| 5,364,211 A | * | 11/1994 | Lund | 410/108 |
| 5,827,023 A | * | 10/1998 | Stull | 410/110 |
| 6,270,301 B1 | * | 8/2001 | Dunlop | 410/115 |
| 6,350,089 B1 | * | 2/2002 | Tekavec | 410/106 |
| 6,390,744 B1 | * | 5/2002 | Parkins | 410/106 |

* cited by examiner

Primary Examiner—Stephen T. Gordon
(74) Attorney, Agent, or Firm—Kenneth H. Jade; Davis & Jack, L.L.C.

(57) ABSTRACT

A cargo tie down assembly attachment method for straightening and reinforcing a pickup truck bed wall having a bowed cornice, the apparatus including of a "U" beam having a bed wall drawing flange, the bed wall drawing flange having upper and lower ends, a rear flange having upper and lower ends, a web spanning between the upper ends of the bed wall drawing flange and the rear flange, and having a plurality of screw receiving apertures extending through the web; and including left and right pivotally mounted "D" rings mounted upon the rear flange by left and right ring mount plates; the straightening and reinforcing method including steps of providing such apparatus, placing the apparatus over the cornice, drilling screw receiving apertures into the cornice, inserting screws through the screw receiving apertures, and turning the screws in a left to right or right to left succession, drawing the apparatus downward over the cornice, and causing the bed wall drawing flange to straighten the bow of the cornice.

4 Claims, 3 Drawing Sheets

TIE DOWN ASSEMBLY ATTACHMENT METHOD FOR STRAIGHTENING AND REINFORCING PICKUP TRUCK BED WALLS

FIELD OF THE INVENTION

This invention relates to pickup truck bed front walls. More particularly, this invention relates to a cargo tie down attachment method adapted for straightening and reinforcing such walls.

BACKGROUND OF THE INVENTION

Pickup trucks are commonly used to transport heavy articles, such as refrigerators and lawn tractors. Where a pickup truck is used to transport an article such as, a refrigerator, the article is typically located at the forward end of the truck bed, against the front wall of the bed. Such placement of the exemplary refrigerator assures that upon braking, the refrigerator will not slide forwardly, undesirably impacting against the pickup truck's cab.

A common pickup truck, upon accelerating, braking, or turning, is capable of imposing up to 0.92 laterally directed "G" forces upon cargo secured in its truck bed. Where a 600 pound refrigerator is well secured against the forward bed wall of a pickup truck, such wall must withstand approximately 552 pounds of pressure exerted by the refrigerator upon maximum forward braking. Upon maximum rearward braking, where such refrigerator is secured by a loading strap, the strap mounts must each resist approximately 225 pounds of pulling force.

Insecure loading resulting from loose or omitted loading straps tends to magnify the forces which are applied to pickup truck bed and front walls. For example, upon maximum forward braking, and upon insecure loading of the exemplary 600 pound refrigerator, such refrigerator may slide forwardly over the truck bed, reaching a speed of at least 1 m.p.h. with respect to the bed. Such moderate sliding motion results in an additional 1.6 "G" forces applied to the bed front wall upon impact. Thus, upon insecure loading of such exemplary refrigerator, the front wall of the pickup truck bed may be required to withstand approximately 1,500 pounds of force.

Common pickup truck bed front walls are composed of sheet steel having a thickness between 3/32" and 1/8". The upper edge of such front walls are typically formed into a "J" channel or rolled cornice. Such common pickup truck bed front walls are incapable of withstanding lateral forces such as are described above without undergoing undesirable deformation or bowing. As a result of the inability of such common pickup truck bed front walls to withstand such forces, pickup trucks commonly have an undesirably forwardly bowed front bed walls, and are in need of repair. Also, due to the thinness of the sheet metal utilized in such common pickup truck bed front walls, such walls provide an insecure mounting surface for attachment of mounting cleats or tie down mounting plates.

The instant inventive apparatus and method solves or ameliorates the above undesirable traits of pickup truck bed front walls by providing a "U" channel beam reinforcing member which is capable as dually serving as a bed wall straightening tool.

BRIEF SUMMARY OF THE INVENTION

A major component of the apparatus of the instant inventive apparatus and method comprises a "U" channel beam having a forward bed wall drawing flange, a rear flange, and having a web spanning between upper ends of the bed wall drawing flange and the rear flange. Preferably, the lateral width of the web is fitted so that it may co-extensively overlie the lateral dimension of the cornice of a common pickup truck bed front wall. Preferably, the "U" channel beam is composed of shear formed sheet steel having a thickness between 1/8" and 3/16". Preferably, the rear flange extends downwardly from the web between 1¾" and 2", and preferably the bed wall drawing flange extends downwardly a lesser distance between 1" and 1½". Preferably, the lower edge of the bed wall drawing flange is outwardly rolled or chamfered. The web of the "U" channel beam is necessarily apertured for receipt of fasteners such as common spirally threaded machine screws, spirally threaded sheet metal screws, or spirally threaded bolts. Preferably, the apertures within the web are centered along the web's longitudinal midline, and the apertures are preferably evenly spaced at one foot to eighteen inch intervals. The upper openings of such apertures are preferably chamfered or coffered, allowing enlarged heads of such screws or bolts to recess downwardly. Recessing the fastener heads eliminates protrusions and facilitates flush mounting of articles such as camper shells upon the upper surface of the web.

The apparatus of the instant invention preferably further comprises left and right load strap fastening means, preferably in the form of "D" rings, "O" rings, "T" hooks, "J" hooks, or cleats. Means for mounting such load strap fastening means upon the rear flange of the "U" channel beam are necessarily provided. While heat fusion welds may be suitably utilized, the mounting means preferably comprise left and right mounting plates adapted for fixedly and pivotally attaching the load strap mounting means. Preferably, both the left and the right mounting plates and the rear flange of the "U" channel beam are apertured for receipt of fasteners such as spirally threaded bolts, spirally threaded machine screws, spirally threaded sheet metal screws, or rivets.

The apparatus of the instant invention is preferably installed upon an exemplary forwardly bowed pickup truck bed front wall by placing the left end of the "U" channel beam over the left end of the cornice of the bed wall. A power drill is then utilized to drill a sheet metal screw receiving pilot hole through the left end of the cornice, at a position underlying the left most aperture of the web of the "U" channel beam. Alternately the pilot holes may be punched. Thereafter, a preferred sheet metal screw is driven through said apertures, fixing the left end of the "U" channel beam in place over the left end of the cornice. Upon such installation of the left end of the "U" channel beam over the left end of the cornice, the "U" channel beam is oriented tangentially with respect to the bowed arch of the pickup truck bed wall. Thereafter, a rearward pulling force may be applied to the right end of the "U" channel beam, while a downward pushing force is applied to the left end of the "U" channel beam at a point near the next successive aperture within the web of the "U" channel beam. Such simultaneous application of forces causes the bow drawing flange of the "U" channel beam to pull the cornice rearwardly into the channel of the "U" channel beam, effectively straightening the cornice along a line between the first and second apertures of the web. Thereafter, a second preferred sheet metal screw is installed within such next successive aperture in the manner described above.

By repeating the above steps for each screw receiving aperture along the web of the "U" channel beam, the entire cornice of the pickup truck bed front wall is drawn into the straight channel of the "U" channel beam, effectively straightening the formerly bowed cornice. The above straightening process may alternately be executed following a right to left progression. In order to straighten slight bows within a pickup truck bed's front wall, levering pulling forces are not necessarily applied to the "U" channel beam. Straightening of slight bows may be accomplished solely by means of turning of sheet metal screws.

Upon straightening a pickup truck bed front wall through use of the apparatus and method of the instant invention, the cornice of such wall is substantially reinforced against subsequent impacts and pressure from shifting loads. The apparatus further reinforces the front bed wall by providing securely attached load tie-down means.

Accordingly, it is an object of the present invention to provide an apparatus and method for reinforcing and straightening a pickup truck bed wall which utilizes a "U" channel beam which dually functions as bed wall straightening means, and bed wall reinforcing means.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
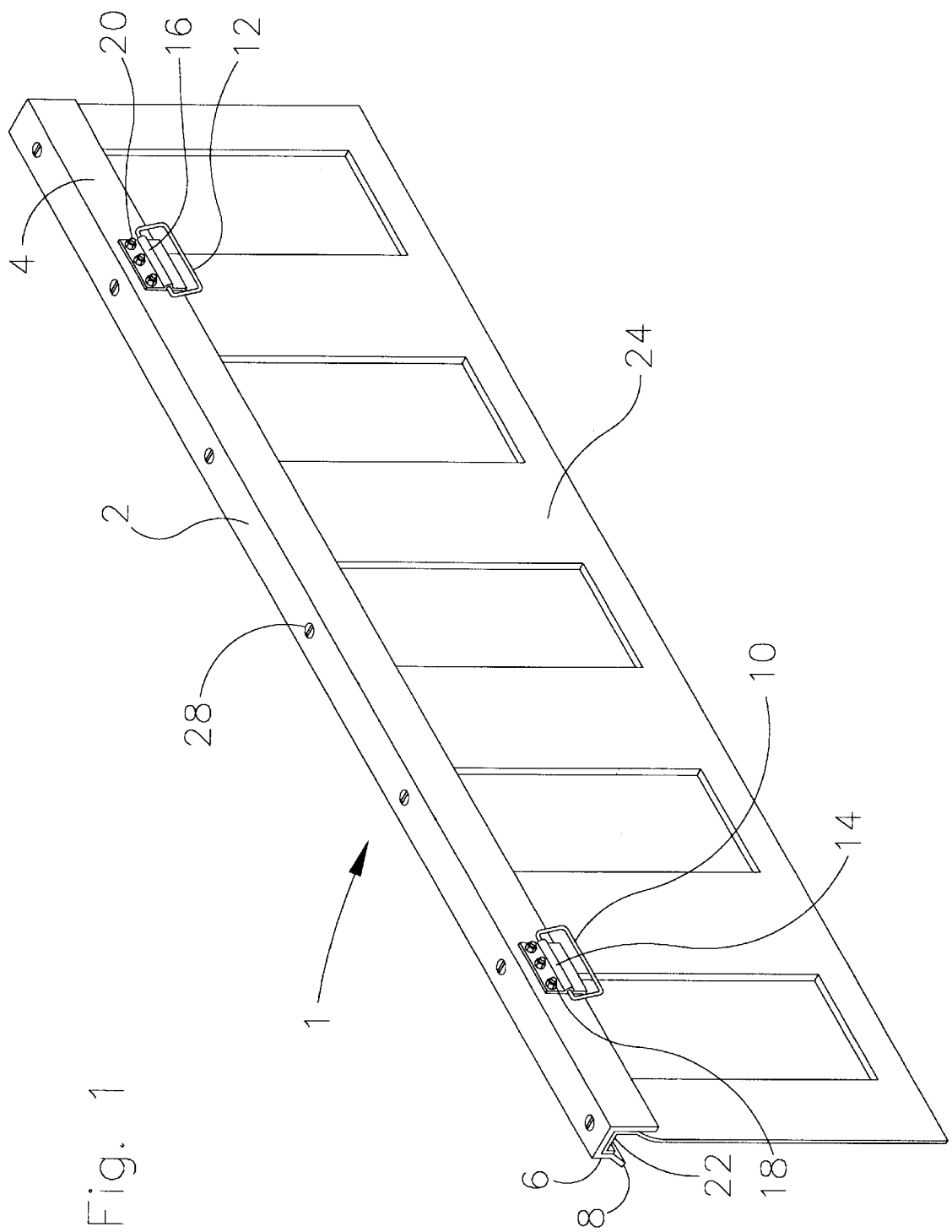
FIG. 1 is an isometric view of the apparatus of the instant inventive apparatus and method, the apparatus being shown installed upon a pickup truck bed front wall.
Figure 2:
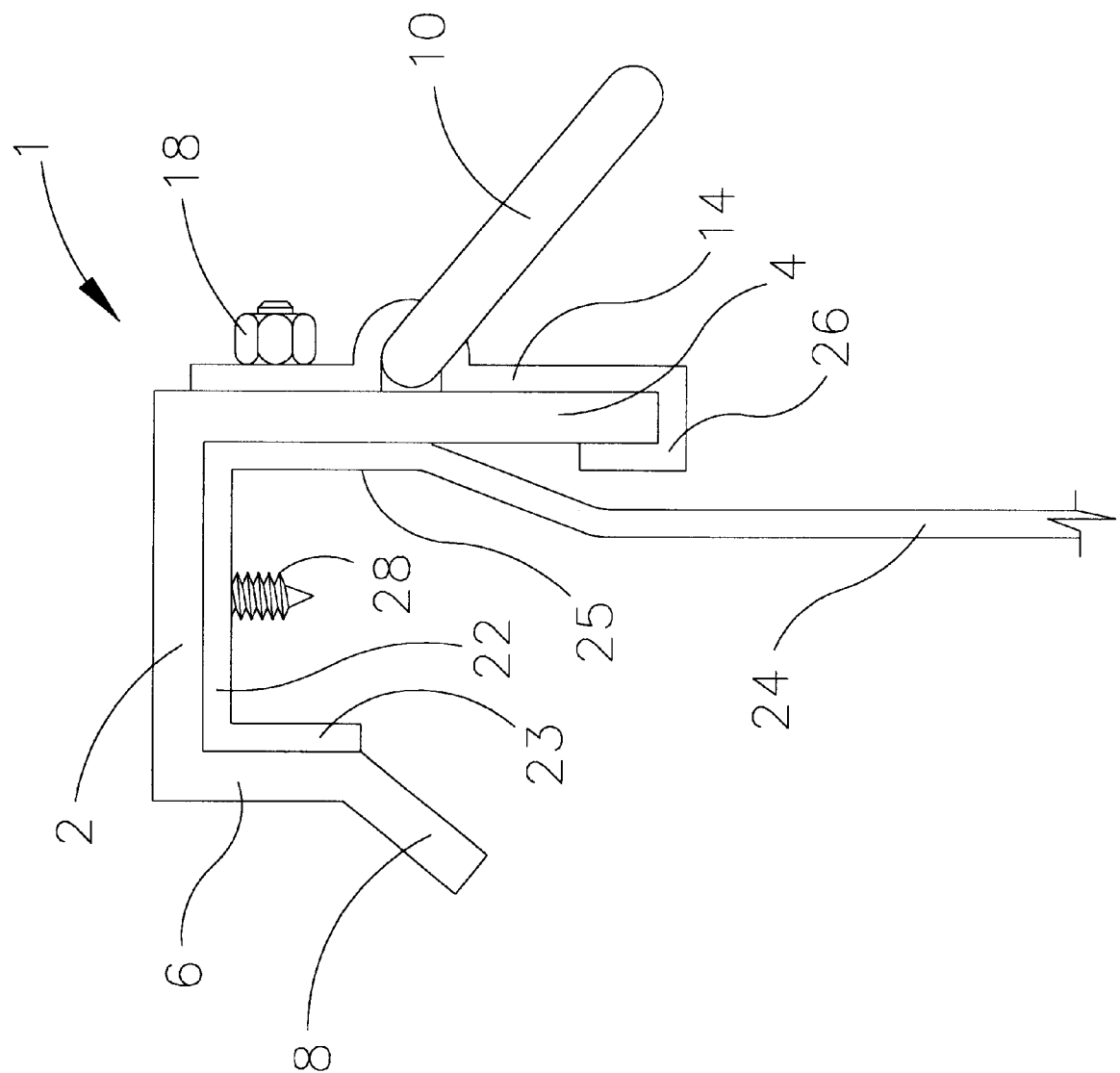
FIG. 2 is a side view of the apparatus depicted in FIG. 1.
Figure 3:
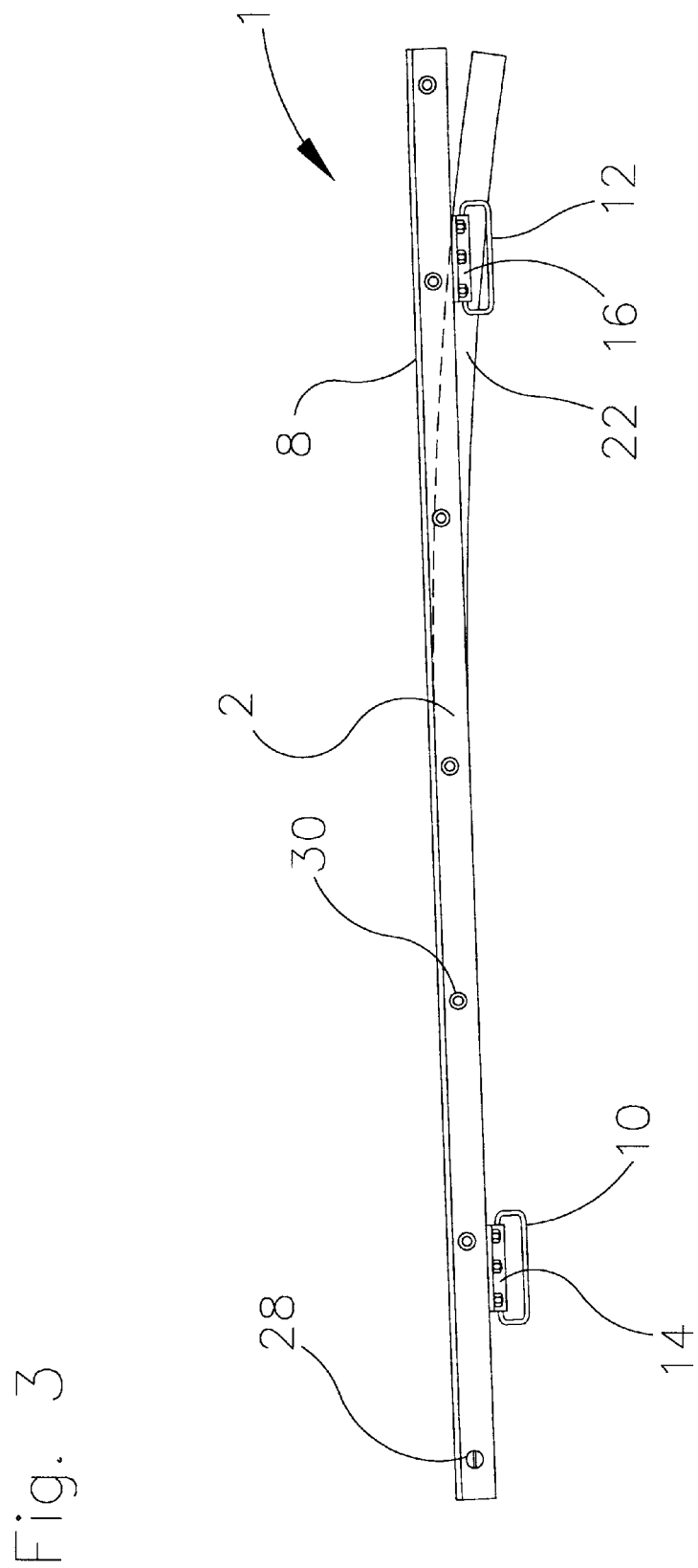
FIG. 3 is a plan view of the instant inventive apparatus shown in an intermediate installation step upon a pickup truck bed wall.

Referring to the drawings, and in particular, simultaneously to FIGS. 1 and 2, the apparatus utilized in the present inventive apparatus and method preferably comprises a "U" channel beam referred to generally by reference arrow 1. The "U" channel beam 1 has a forward bed wall drawing flange 6, a rear flange 4, and a web 2 spanning between the upper ends of flanges 4 and 6. Referring to FIG. 3, the web 2 preferably has a plurality of sheet metal screw receiving apertures 30. Referring simultaneously to FIGS. 2 and 3, such apertures 30 are preferably conically chamfered for receipt of flat headed sheet metal screws 28.

Referring simultaneously to FIGS. 1 and 2, the lower end of bed wall drawing flange 6 preferably has a forwardly chamfered section 8. Preferably, the rear flange 4 of "U" channel beam 1 has a plurality of bolt receiving apertures (not depicted) for receipt of nut and bolt combinations 18. Preferably, the forward openings of such apertures within rear flange 4 are conically chamfered for receipt of bolts having flat countersinking heads. "D" rings 10 and 12 are preferably fixedly and pivotally mounted upon the rearward surface of rear flange 4 by means of left and right mounting plates 14 and 16. Preferably, the lower ends of mounting plates 14 and 16 form flange engaging "J" hooks 26, while the upper ends of mounting plates 14 and 16 are apertured for receipt of nut and bolt combinations 18 and 20.

In use of the inventive apparatus, referring simultaneously to all figures, the left (or alternately right) end of "U" channel beam 1 is placed over the left end of a forwardly bowed cornice 22 of a pickup truck bed front wall 24. Thereafter, a power drill is utilized to drill a pilot hole underlying the leftmost aperture 30 for installation of the leftmost sheet metal screw 28. A rearward pulling force is then applied to the right end of "U" channel beam 2, while a downward pushing force is applied to the left end, allowing the bed wall drawing flange 6, along with chamfered section 8 to engage and rearwardly draw cornice front flange 23, driving the rear wall 25 of cornice 22 toward rear flange 4. By repeating the process described above for each screw receiving aperture 30, the "U" channel beam 1 is firmly affixed over cornice 22, and cornice 22 is straightened by "U" channel beam 1. Upon such installation, cornice 22 is reinforced against excessive pressure and impacts. Cornice 22 is further reinforced through provision of securely attached tie down rings 10 and 12.

While the principles of the invention have been made clear in the above illustrative embodiment, those skilled in the art may make modifications in the structure, arrangement, portions, components and method steps of the invention without departing from those principles. Accordingly, it is intended that the description and drawings be interpreted as illustrative and not in the limiting sense, and that the invention be given a scope commensurate with the appended claims.

I claim:

1. A method for straightening and reinforcing a pick up truck bed wall, said wall having a cornice, the cornice having left and right ends, the cornice being bowed, the method comprising steps of:
    a) providing a "U" beam having a bed wall drawing flange, a rear flange, a web spanning between upper ends of said flanges, and having a first plurality of fastener receiving apertures extending through the web;
    b) providing a plurality of spirally threaded screws or bolts fitted for extension through the fastener receiving apertures;
    c) drilling or punching a second plurality of fastener receiving apertures through the cornice of the pickup truck bed wall, said apertures being positioned so that they may, upon placement of the "U" beam over the cornice, underlie and align with the first plurality fastener receiving apertures;
    d) placing the "U" beam over the cornice of the bowed pickup truck bed wall;
    e) inserting the spirally threaded screws or bolts through the first and second pluralities of fastener receiving apertures; and,
    f) operating the spirally threaded screws or bolts to draw the "U" beam downwardly toward the cornice, causing the bed wall drawing flange to straighten the bow of the cornice.

2. The method of claim 1 wherein the inserting and operating steps are performed in a left to right or in a right to left progression.

3. The method of claim 1 further comprising steps of providing load strap fastening means, providing mounting means, and operating the mounting means to interconnect the load strap fastening means and the rear flange of the "U" beam.

4. The method of claim 2 further comprising the step of levering the "U" beam against the bowed cornice, said step being performed contemporaneously with the screw or bolt operating step.

* * * * *